US008477657B2

(12) United States Patent
Wang et al.

(10) Patent No.: US 8,477,657 B2
(45) Date of Patent: Jul. 2, 2013

(54) METHOD AND DEVICE FOR SENDING INTER-FREQUENCY MEASUREMENT CONFIGURATIONS DOWNWARDS

(75) Inventors: Xingang Wang, Shenzhen (CN); Jiaying You, Shenzhen (CN); Xiaoxi Jing, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/582,879

(22) PCT Filed: Dec. 31, 2010

(86) PCT No.: PCT/CN2010/080649
§ 371 (c)(1),
(2), (4) Date: Sep. 5, 2012

(87) PCT Pub. No.: WO2011/150656
PCT Pub. Date: Dec. 8, 2011

(65) Prior Publication Data
US 2012/0327810 A1    Dec. 27, 2012

(30) Foreign Application Priority Data
Jun. 1, 2010    (CN) .......................... 2010 1 0195666

(51) Int. Cl.
*H04L 12/28*   (2006.01)
*G01R 31/08*   (2006.01)
*H04W 36/00*   (2009.01)

(52) U.S. Cl.
USPC ............................ 370/254; 370/252; 455/436

(58) Field of Classification Search
None
See application file for complete search history.

(56) References Cited

U.S. PATENT DOCUMENTS

| 8,385,920 | B2 * | 2/2013 | Iwamura | 455/437 |
| 2006/0286945 | A1 | 12/2006 | Reznik et al. | |
| 2010/0260147 | A1 * | 10/2010 | Xing et al. | 370/332 |
| 2011/0183672 | A1 * | 7/2011 | Jeong et al. | 455/436 |

FOREIGN PATENT DOCUMENTS

| CN | 101127998 A | 2/2008 |
| CN | 101300753 A | 11/2008 |

OTHER PUBLICATIONS

International Search Report from corresponding PCT application PCT/CN2010/080649, mailed Apr. 7, 2011 (with English translation).

* cited by examiner

*Primary Examiner* — Hassan Phillips
*Assistant Examiner* — Hicham Foud
(74) *Attorney, Agent, or Firm* — IPLM Group, P.A.

(57) ABSTRACT

A method for sending inter-frequency measurement configurations is disclosed, including: an eNB performing a swap action on a measurement configuration copy formed according to a measurement configuration to obtain a first measurement configuration; the eNB generating a second measurement configuration according to its own configuration and UE capability, and comparing the second measurement configuration with the first one; if the first and second measurement configuration are the same, the measurement configurations being not filled in the controlling message; if the first measurement configuration is a part of the second measurement configuration, in the controlling message, the extra measurement configuration being put in an adding list at the destination side; if they are different, in the controlling message, the first measurement configuration being put in a deleting list, the second one being put in the adding list; and the eNB sending a RRC connection reconfiguring message to the UE.

15 Claims, 4 Drawing Sheets

METHOD AND DEVICE FOR SENDING INTER-FREQUENCY MEASUREMENT CONFIGURATIONS DOWNWARDS

TECHNICAL FIELD

The present invention relates to the field of long term evolution (LTE), and more especially, to a method and device for sending inter-frequency measurement configurations.

BACKGROUND OF THE RELATED ART

According to the 36331 protocol, when a Radio Resource Control (RRC) connection reconfiguration message received by the user equipment (UE) comprises mobility control information and when the inter-frequency switching or inter-frequency RRC connection reconstruction is performed, the UE will perform the following actions:
1> if the signal element of measurement object identification list (measObjectIdList) in the measurement configuration (VarMeasConfig) stored at the UE side has a measurement object identification (measObjectId) corresponding to the destination side cell (referred to as the D side cell) frequency point;
   2> for each measurement identification (measId) corresponding to the measurement identification list (measIdList);
      3> if the measObjectId connected with the measId is the source side cell (referred to as the S side cell) carrier frequency;
         4> connect the measId to the measObjectID corresponding to the D side cell carrier frequency;
      3> if the measObjectId connected with the measId is the D side cell carrier frequency;
         4> connect this measId to the measObjectId corresponding to the S side cell carrier frequency;
1> if the signal element of measObjectIdList in the VarMeasConfig does not have a measObjectId corresponding to the D side cell frequency point
   2> delete the measId of all the measObjectId connected to the S side cell carrier frequency;
. . .
1> if the received RRC connection reconfiguration message includes the measConfig;
   2> execute the measurement configuration in the RRC connection reconfiguration message;

Herein, this action is called the Swap action, from the protocol, it can be seen that it is the mandatory action for the inter-frequency switching and the inter-frequency RRC connection reconstruction. Table 1 and Table 2 show the measurement configuration examples before and after the UE performs the Swap action. The first cell and the second cell are inter-frequency neighboring cells, the UE initially accesses the first cell, at this time, the measurement configuration of the UE is the same as the measurement configuration of the first cell. When performing the inter-frequency switching or the inter-frequency RRC connection reconstruction, the UE performs the aforementioned Swap action. The second cell performs the Swap action on the measurement configuration sent from the first cell and saves it so that the UE measurement configuration can be guaranteed to be consistent with the measurement configuration at the second cell side, the RRC connection reconfiguration message does not send the measurement configuration, which reduces the XI interface signaling transmission between the base station and the UE.

TABLE 1 an example of the measurement configuration saved by the UE before the inter-frequency switching and the inter-frequency RRC connection reconstruction

| MeasID | MeasObjectID | ReportConfigID |
|---|---|---|
| 1 | 1 | 2 (A2) |
| 2 | 1 | 4 (ANR) |
| 3 | 2 | 5 (A3) |
| 4 | 3 | 5 (A3) |
| 5 | 9 | 8 (B2) |

TABLE 2 an example of the measurement configuration after the UE performs the Swap on the measurement configuration after the inter-frequency switching and the inter-frequency RRC connection reconstruction

| MeasID | MeasObjectID | ReportConfigID |
|---|---|---|
| 1 | 2 | 2 (A2) |
| 2 | 2 | 4 (ANR) |
| 3 | 1 | 5 (A3) |
| 4 | 3 | 5 (A3) |
| 5 | 9 | 8 (B2) |

The aforementioned method can reduce the XI interface signaling and improve the system efficiency, but it does not take into account the D side cell configuration, therefore, there are problems appear in the following circumstances:

suppose that there exist three cells, cell_0 takes the celli and the cell_2 as its neighboring cells, the frequency points of the three neighboring cells are not the same, the UE initially accesses the cell_0, and accesses the cell_1 by inter-frequency switching\inter-frequency RRC connection reconstruction.

If the cell_1 does not take the cell_0 as its neighboring cell, it does not take the cell_0 frequency point as the inter-frequency point in configuration. After the switching or the RRC connection reconstruction, all the inter-frequency measurement events aiming to the cell_0 frequency point are unreasonable, this is because the cell_1 does not take the cell_0 as its inter-frequency neighboring cell, and it should not configure measurement events related to the cell_0 frequency point.

If the Evolved Node B (eNB) in which the cell_0 is located supports the Automatic Neighbor Relation (ANR) function and is configured with the measurement events; the eNB of the cell_1 does not support the ANR function and is not configured with the measurement event; after the switching or the RRC connection reconstruction, the measurement configuration of the cell_1 has the measurement configuration that does not support the ANR function, but it is unreasonable for configuring the UE with the measurement configuration which does not ought to be existed.

If the cell_1 does not take the cell_2 as its neighboring cell, it does not take the cell_2 frequency point as an inter-frequency point in configuration. After the switching or RRC connection reconstruction, all inter-frequency measurement events aiming to the cell_2 frequency point are unreasonable.

If the cell_0 does not support the Inter Cell Interference Coordination (ICIC) function while the cell_1 does, and it needs to send the ICIC related measurement events to all the UEs accessing the cell_1 to solve the problem of same frequency interference, since the cell_0 does not configure the UE with the ICIC related measurement events, after the switching or the RRC connection reconstruction, the UE does not have the ICIC related measurement events, which does not achieve the objective of avoiding the same frequency interference by the cell_1 sending the ICIC to all the UEs accessing the cell_1.

The aforementioned four scenarios can lead to that the UE is lack of measurement configuration or the measurement configuration is not available after the inter-frequency switching or the inter-frequency RRC connection reconstruction, the same SWAP action made by the base station as that made by the UE can only solve the problem of configuration consistence, but it cannot guarantee the accuracy of the measurement configuration.

SUMMARY OF THE INVENTION

The purpose of the present invention is to provide a method and device for sending inter-frequency measurement configurations to correctly send inter-frequency measurement configurations and to better solve the problem that the UE is lack of the measurement configuration or the measurement configuration is not available.

According to one aspect of the present invention, a method for sending an inter-frequency measurement configuration, the method comprises:

an evolved Node B (eNB) performing a Swap action on a measurement configuration copy formed on a basis of the measurement configuration to obtain a first measurement configuration;

the eNB generating a second measurement configuration according to configuration of the eNB and user equipment (UE) capability, and comparing the second measurement configuration with the first measurement configuration;

when the first measurement configuration and the second measurement configuration are the same, measurement configuration being not filled in a controlling message; when the first measurement configuration is a part of the second measurement configuration, in the controlling message, an extra measurement configuration at a destination side being placed in an adding list; when the first measurement configuration and the second measurement configuration are not the same, in the controlling message, the first measurement configuration being placed in a deleting list, and the second measurement configuration being placed in the adding list; and the eNB sending a Radio Resource Control (RRC) connection reconfiguration message to the UE according to the controlling message.

The inter-frequency measurement configuration is an inter-frequency switching measurement configuration or an inter-frequency RRC connection reconstruction measurement configuration.

When the sending the inter-frequency measurement configuration is sending intra-eNB inter-frequency switching measurement configuration, before the step of the eNB performing the Swap action on a measurement configuration copy formed on the basis of the measurement configuration to obtain the first measurement configuration, said method further comprises: the eNB receiving a measurement report reported by the UE, and determining an inter-frequency switching based on the measurement report, and duplicating the measurement configuration into a measurement configuration copy and saving the measurement configuration copy;

said controlling message is a RRC connection reconfiguration message.

In the step of the eNB sending the RRC connection reconfiguration message to the UE, the sending the measurement configuration is sending the intra-eNB switching.

When the sending the inter-frequency measurement configuration is sending the inter-eNB inter-frequency switching measurement configuration, before the step of the eNB performing the Swap action on the measurement configuration copy formed on the basis of the measurement configuration to obtain the first measurement configuration, said method comprises: after receiving the measurement report reported by the UE, the source side eNB determining an inter-frequency switching, and determining the inter-frequency switching as X2 or S1;

the step of the eNB performing the Swap action on a measurement configuration copy formed on the basis of the measurement configuration to obtain the first measurement configuration comprises: the source side eNB forming a measurement configuration copy from the current measurement configuration, and transmitting the measurement configuration copy to the destination side eNB; the destination side eNB performing the Swap action on the source side measurement configuration copy to obtain the first measurement configuration;

the controlling message is a switching command;

the step of the eNB generating the second measurement configuration according to configuration of the eNB and the UE capability comprises: the eNB at a destination side generating the second measurement configuration according to the configuration of the eNB and the user equipment (UE) capability and storing the second measurement configuration;

the step of eNB sending the RRC connection reconfiguration message to the UE according to the controlling message comprises: the eNB at the destination side sending the switching command to the eNB at a source side, and the eNB of the source side generating and sending a RRC connection reconfiguration message according to the switching command.

In the step of the eNB at the source side generating and sending the RRC connection reconfiguration message in accordance with the switching command, a way of sending measurement configuration is the way of X2 switching and sending and the way of S1 switching and sending.

When the sending the inter-frequency measurement configuration is sending the RRC connection reconstruction measurement configuration, the step of the eNB performing the Swap action on a measurement configuration copy formed on the basis of the measurement configuration to obtain the first measurement configuration comprises: after the UE sends an inter-frequency measurement configuration to the eNB and receives a response, the eNB performing the Swap action on the saved measurement configuration copy at the source side to obtain the first measurement configuration;

the controlling command is the RRC connection reconfiguration message.

In the step of the eNB sending the RRC connection reconfiguration message, a way of sending the measurement configuration is the way of sending the inter-frequency RRC connection reconstruction.

According to one aspect of the present invention, a device for sending an inter-frequency measurement configuration, comprising:

a Swap action unit, configured to: perform a Swap action on a measurement configuration copy at a source side to obtain a first measurement configuration; and send the first measurement configuration to a measurement configuration comparison unit connected with the Swap action unit;

a measurement configuration generation unit, configured to: generate a second measurement configuration according to eNB's own related configuration and user equipment (UE)

capability, and send the second measurement configuration to a measurement configuration comparison unit connected with the measurement configuration generation unit;

a measurement configuration comparison unit, configured to: receive the second measurement configuration and the first measurement configuration and compare the second measurement configuration with the first measurement configuration; fill in a controlling message according to the comparison result and transmit the controlling message to a measurement configuration transmission unit connected with the measurement configuration comparison unit; wherein, when the first measurement configuration and the second measurement configuration are the same, measurement configuration is not filled in the controlling message; when the first measurement configuration is a part of the second measurement configuration, in the controlling message, an extra measurement configuration at a destination side is placed in an adding list; when the first measurement configuration and the second measurement configuration are not the same, in the controlling message, the first measurement configuration is placed in a deleting list, and the second measurement configuration is placed in the adding list; and a measurement configuration transmission unit, configured to: send a Radio Resource Control (RRC) connection reconfiguration message to the UE according to the controlling message.

The inter-frequency measurement configuration is an inter-frequency switching measurement configuration or an inter-frequency RRC connection reconstruction measurement configuration.

When the sending the inter-frequency measurement configuration is sending intra-eNB inter-frequency switching measurement configuration, the Swap action unit is also configured to: after the eNB receives a measurement report reported by the UE, determine an inter-frequency switching based on the measurement report, and duplicate the measurement configuration into a measurement configuration copy and save the copy;

said controlling message is a RRC connection reconfiguration message.

When the measurement configuration transmission unit sends the RRC connection reconfiguration message to the UE, a way of sending the measurement configuration is the way of sending intra-eNB switching.

When the sending the inter-frequency measurement configuration is sending inter-eNB inter-frequency switching measurement configuration, the swap action unit is also configured to: after the eNB at a source side receives the measurement report reported by the UE, determine an inter-frequency switching, and determining a way of inter-frequency switching is X2 or S1;

the Swap action unit is configured to perform the Swap action on a measurement configuration copy formed on a basis of the measurement configuration to obtain the first measurement configuration as follows: when the device is at the source side eNB, form a measurement configuration copy from the current measurement configuration, and transmit the copy to the destination side eNB; when the device is at the destination side eNB, perform the Swap action on the source side measurement configuration copy to obtain the first measurement configuration;

the controlling message is a switching command;

the measurement configuration generation unit is configured to generate a second measurement configuration according to the measurement configuration generation unit's own configuration and the UE capability as follows: when the device is at the destination side eNB, generate and save the second measurement configuration according to the measurement configuration generation unit's own configuration and the user equipment (UE) capability;

the measurement configuration transmission unit is configured to send the RRC connection reconfiguration message to the UE according to the controlling message as follows: when the measurement configuration transmission unit is at the destination side eNB, send the switching command to the source side eNB, and when the measurement configuration transmission unit is at the source side eNB, generate a RRC connection reconfiguration message according to the switching command and send the RRC connection reconfiguration message.

When the sending the inter-frequency measurement configuration is sending the RRC connection reconstruction measurement configuration, the Swap action unit is configured to perform the Swap action on a measurement configuration copy formed on a basis of the measurement configuration to obtain the first measurement configuration as follows: after sending an inter-frequency measurement configuration to the eNB and receiving a response, perform the Swap action on the saved measurement configuration copy at the source side to obtain the first measurement configuration;

the controlling command is the RRC connection reconfiguration message.

The measurement configuration transmission unit is configured to send the RRC connection reconfiguration message by the way of sending the RRC connection reconstruction message.

Compared with the related art, the method and device in the present invention can be used to make the measurement configuration of the cell in which the UE is located after the inter-frequency switching or the inter-frequency RRC connection re-construction correct and consistent with the measurement configuration of the UE, in some scenarios, they can also reduce the XI interface signaling.

PREFERRED EMBODIMENTS OF THE PRESENT INVENTION

The preferred embodiments of the present invention will be described in detail in the following in combination with the accompanying drawings, and it should be understood that the preferred embodiments mentioned below are only used to describe and explain the present invention and are not used to limit the present invention. It should be noted that in the case of no conflict, the embodiments in this application and the characteristics of the embodiments could be combined with each other randomly.

Figure 6:
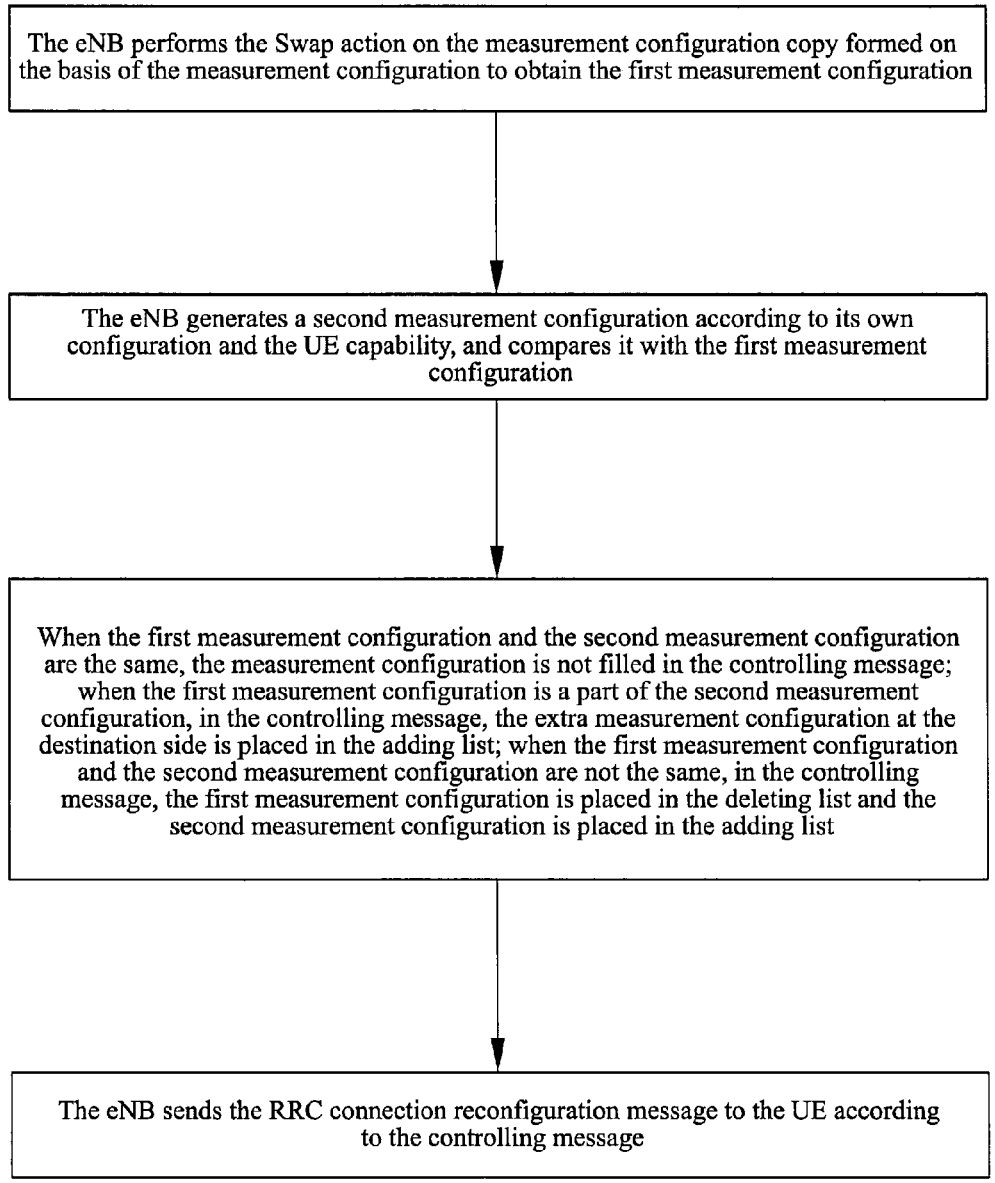
FIG. 6 is a schematic diagram of a method for sending an inter-frequency measurement configuration in accordance with the present invention.

The method for sending the inter-frequency measurement configuration in the present invention is as shown in FIG. 6, the method comprising:

an evolved Node B (eNB) performing a Swap action on a measurement configuration copy formed on the basis of the measurement configuration to obtain a first measurement configuration;

the eNB generating a second measurement configuration according to its own configuration and the user equipment (UE) capability, and comparing the second measurement configuration with the first one;

when the first measurement configuration and the second measurement configuration are the same, the measurement configuration is not filled in the controlling message; when the first measurement configuration is a part of the second measurement configuration, in the controlling message, the extra measurement configuration at the destination side is placed in an adding list; when the first measurement configuration and the second measurement configuration are not the same, in the controlling message, the first measurement configuration is placed in a deleting list, and the second measurement configuration in the adding list; and the eNB sending a Radio Resource Control (RRC) connection reconfiguration message to the UE according to the controlling message.

The inter-frequency measurement configuration is an inter-frequency switching measurement configuration or an inter-frequency RRC connection reconstruction measurement configuration.

Wherein, when sending the inter-frequency measurement configuration is sending the intra-eNB inter-frequency switching measurement configuration, the eNB performing the Swap action on a measurement configuration copy formed on the basis of the measurement configuration to obtain the first measurement configuration, said method also comprises: the eNB receiving a measurement report reported by the UE, and determining that it is an inter-frequency switching based on the measurement report, and duplicating the measurement configuration into a measurement configuration copy and saving the copy;

said controlling message is a RRC connection reconfiguration message.

When sending the inter-frequency measurement configuration is sending the intra-eNB inter-frequency switching measurement configuration, in the step of the eNB sending the RRC connection reconfiguration message to the UE, the way of sending the measurement configuration is the way of sending the intra-eNB switching.

Wherein, when sending the inter-frequency measurement configuration is sending the inter-eNB inter-frequency switching measurement configuration, before the step of the eNB performing the Swap action on a measurement configuration copy formed on the basis of the measurement configuration to obtain the first measurement configuration, said method comprising: after receiving the measurement report reported by the UE, the source side eNB determining that it is an inter-frequency switching, and determining the way of the inter-frequency switching is X2 or S1;

the step of the eNB performing the Swap action on a measurement configuration copy formed on the basis of the measurement configuration to obtain the first measurement configuration comprises: the source side eNB forming a measurement configuration copy from the current measurement configuration, and transmitting the copy to the destination side eNB; the destination side eNB performing the Swap action on the source side measurement configuration copy to obtain the first measurement configuration;

the controlling message is a switching command;

wherein, when sending the inter-frequency measurement configuration is sending the inter-eNB inter-frequency switching measurement configuration, the step of the eNB generating a second measurement configuration according to its own configuration and the UE capability comprises: the destination side eNB generating and saving a second measurement configuration according to its own configuration and the user equipment (UE) capability;

the step of the eNB sending the RRC connection reconfiguration message to the UE according to the controlling message comprises: the destination side eNB sending the switching command to the source side eNB, and the source side eNB generating a RRC connection reconfiguration message according to the switching command and sending the RRC connection reconfiguration message.

In the step of the source side eNB generating a RRC connection reconfiguration message according to the switching command and sending the RRC connection reconfiguration message, the way of sending measurement configuration is the X2 switching and sending way and the Si switching and sending way.

Wherein, when sending the inter-frequency measurement configuration is sending the RRC connection reconstruction measurement configuration, the step of the eNB performing the Swap action on a measurement configuration copy formed on the basis of the measurement configuration to obtain the first measurement configuration comprises: after the UE sends an inter-frequency RRC connection reconstruction request to the eNB and receives a response, the eNB performs the Swap action on the saved source side measurement configuration copy to obtain the first measurement configuration;

the controlling command is the RRC connection reconfiguration message.

Wherein, when sending the inter-frequency measurement configuration is sending the RRC connection reconstruction measurement configuration, in the step of the eNB sending the RRC connection reconfiguration message, the way of sending the measurement configuration is the way of sending the inter-frequency RRC connection reconstruction.

In the following, examples are used to introduce the processes when the method for sending the inter-frequency measurement configuration in the present invention is respectively used in the cases that the process of sending the inter-frequency measurement configuration is the process of sending the inter-frequency switching measurement configuration within the eNB, the process of sending the inter-frequency measurement configuration is the process of sending the inter-frequency switching measurement configuration between the eNBs, as well as the process of sending the inter-frequency measurement configuration is the process of sending the RRC connection reconstruction measurement configuration.

Figure 1:
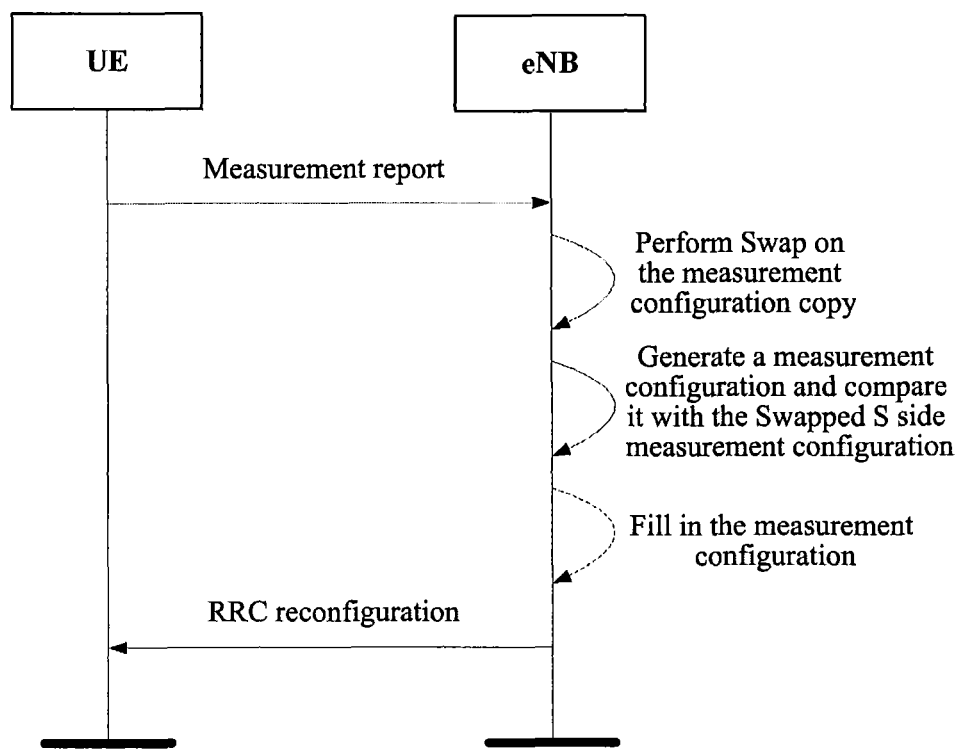
FIG. 1 is flow chart of processing an intra-eNB inter-frequency switching measurement configuration provided in an embodiment of the present invention.

FIG. 1 is a flow chart of processing the intra-eNB inter-frequency switching measurement configuration provided in an embodiment of the present invention, as shown in FIG. 1, its steps are as follows:

the eNB receives a measurement report reported by the UE and determines that it is an inter-frequency switching in accordance with the measurement report, duplicates the current measurement configuration transmitted from the source side cell into a measurement configuration copy and saves the copy;

the eNB performs the Swap action on the measurement configuration copy to obtain a first measurement configuration after the Swap;

the eNB generates a second measurement configuration according to its own configuration, such as the frequency point and ICIC function, the UE capability such as the supported band, and the inter-frequency system, and so on, and compares it with the first measurement configuration;

when the first measurement configuration and the second measurement configuration are the same, the measurement configuration is not filled in the RRC connection reconfiguration message; when the first measurement configuration is a part of the second measurement configuration, the extra measurement configuration at the destination side is placed in the adding list in RRC connection reconfiguration message; when the first measurement configuration and the second measurement configuration are not the same (including completely different, different in part and same in the other part), the first measurement configuration in the RRC connection reconfiguration message is placed into the deleting list, and the second measurement configuration is placed in the adding list;

the eNB sends the RRC connection reconfiguration message to the UE.

The aforementioned measurement configurations, the first measurement configuration and the second measurement configuration comprise the measurement ID (MeasID), the measurement object identification (MeasObjectID), the measurement object (MeasObject,), the report configuration identification (ReportConfigID), and the report configuration (ReportConfig).

According to the aforementioned method for processing the intra-eNB switching measurement configuration, assuming that there are two mutually inter-frequency neighboring cells: the cell_0 and the cell_1 are in the same eNB, the UE accesses the cell_0 and after the cell_0 sends the same frequency switching and the inter-frequency switching measurement event, the intra-eNB switching process is as follows:

1. the UE reports an inter-frequency switching event, and the cell_1's neighboring cell information is filled in the measurement report;

2. the eNB determines that the neighbor cell cell_1 reported by the UE is a cell within this eNB, it initiates an intra-eNB switching, and the eNB duplicates the current measurement configuration into a measurement configuration copy and saves the copy, and performs Swap action on the copy to generate the first measurement configuration;

the aforementioned saved measurement configuration is the measurement configuration at the cell_0 side;

3. the cell_1 generates a second measurement configuration according to its own related configuration and the UE capability, and compares the second measurement configuration with the first one;

4. when the first measurement configuration and the second measurement configuration are the same, the measurement configuration is not filled in the RRC connection reconfiguration message;

5. the eNB sends the RRC connection reconfiguration message to the UE.

In the case that the measurement configurations are exactly the same, the measurement configuration does not need to be filled in the RRC connection reconfiguration message, thereby reducing the X1 interface signaling.

Figure 2:
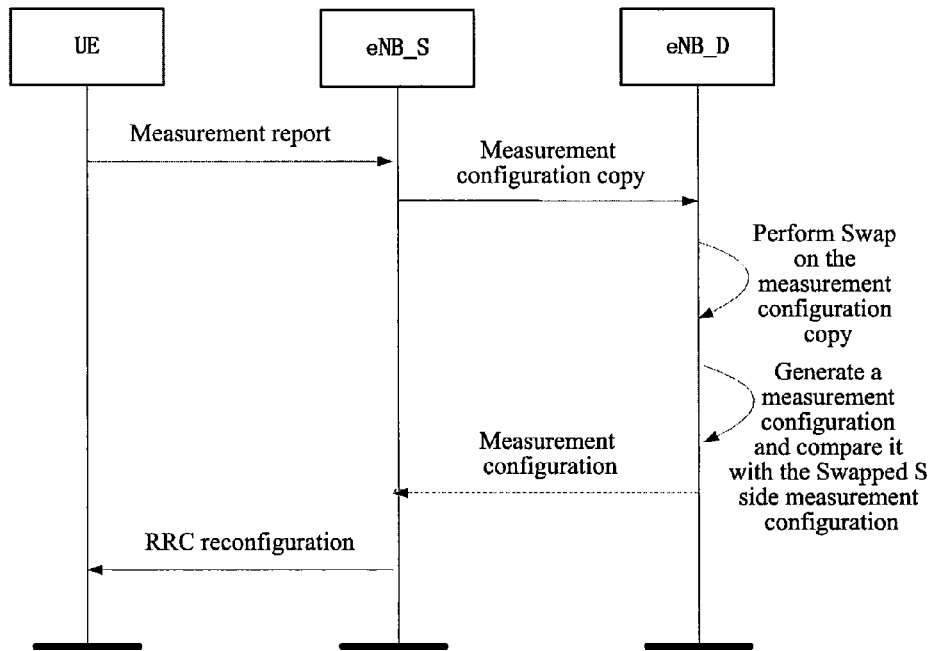
FIG. 2 is flow chart of processing the inter-eNB X2 inter-frequency switching measurement configuration provided in an embodiment of the present invention.
Figure 3:
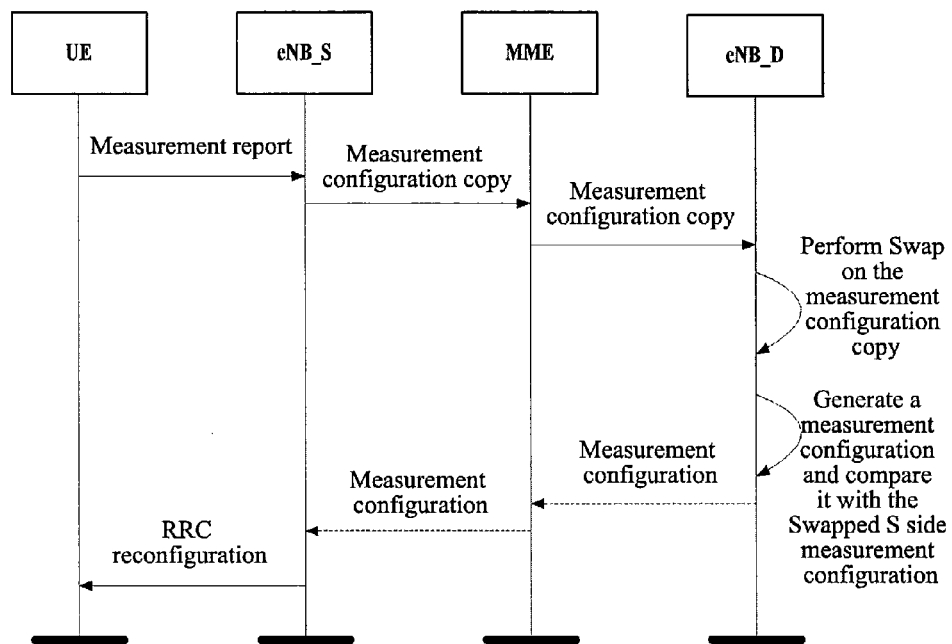
FIG. 3 is flow chart of processing the inter-eNB S1 inter-frequency switching measurement configuration provided in an embodiment of the present invention.

FIG. 2 shows a flow chart of processing the inter-eNB X2 inter-frequency switching measurement configuration provided in an embodiment of the present invention, and FIG. 3 shows a flow chart of processing the inter-eNB S1 inter-frequency switching measurement configuration provided in an embodiment of the present invention, as shown in FIG. 2 and FIG. 3, the two eNBs are the source side eNB-S and the destination side eNB-D respectively, the steps of the inter-eNB inter-frequency switching are as follows:

the eNB-S receives the measurement report reported by the UE, judges whether it is the inter-frequency switching method of X2 or S1, and forms a measurement configuration copy from the current source side measurement configuration and transmits the copy to the eNB-D, if it is the S1 switching, the eNB-D receives the source side measurement configuration copy sent by the eNB-S through the mobility management entity (MME);

the eNB-D performs the Swap action on the source side measurement configuration copy to obtain a first measurement configuration;

the eNB-D generates a second measurement configuration according to its own configuration, such as the frequency point and ICIC function, the UE capability such as the supported band, the inter-frequency system, and so on, and stores the second measurement configuration;

compare the first measurement configuration with the second one, when the first measurement configuration and the second measurement configuration are the same, the measurement configuration is not filled in the switching message; when the first measurement configuration is a part of the second measurement configuration, the extra measurement configuration at the destination side is placed to the adding list in the switching message; when the first measurement configuration and the second measurement configuration are not the same, the first measurement configuration in the switching message is placed into the deleting list, and the second measurement configuration is placed in the adding list.

The switching command is forwarded to the eNB-S, the eNB-S generates a RRC connection reconstruction message according to the switching command and sends the message to the UE through the X1 interface between the UE and the eNB-S.

The aforementioned measurement configurations, the first measurement configuration and the second measurement configuration comprise the measurement ID (MeasID), the measurement object identification (MeasObjectID), the measurement object (MeasObject,), the report configuration identification (ReportConfigID), and the report configuration (ReportConfig).

According to the aforementioned method for switching the measurement configuration in the eNB, assuming that there are two mutually inter-frequency neighboring cells: the cell_0 and the cell_1 with the cell_0 in eNB-S and the cell_1 in eNB-D, and the cell_1 does not take the frequency point of the cell_0 as a different frequency point for configuration; the UE accesses the cell_0 and after the cell_0 sends the ICIC measurement event and the inter-frequency switching measurement event, the switching process between the eNB is as follows by taking X2 switching as an example:

1. the UE reports an inter-frequency switching event, and the cell_1's neighboring cell information is filled in the measurement report;

2. the eNB-S determines that the reported neighboring cell cell_1 is a cell within the eNB-D, and initiates a X2 switching;

3. the eNB-S saves the current measurement configuration and duplicates it into a measurement configuration copy, and sends the measurement configuration copy along with the switching ready request message to the eNB-D; the eNB-D performs the Swap action on the measurement configuration copy sent by the eNB-S to obtain the first measurement configuration, and generates a second measurement configuration according to its own configuration such as the frequency point and the ICIC function, the UE capability such as the supported frequency band, the inter-frequency system, and so on, and compares the first measurement configuration with the second measurement configuration;

4. since the cell__1 does not take the cell__0 frequency point as the measured inter-frequency frequency point, the comparison result is that the first measurement configuration and the second measurement configuration are not the same, in the switching command, the first measurement configuration is placed in the deleting list and the second measurement configuration is placed in the adding list;

5. send the switching command to the eNB-S, the eNB-S generates a RRC connection reconfiguration message according to the switching command, and sends the message through the X1 interface between the UE and the eNB-S.

Figure 4:
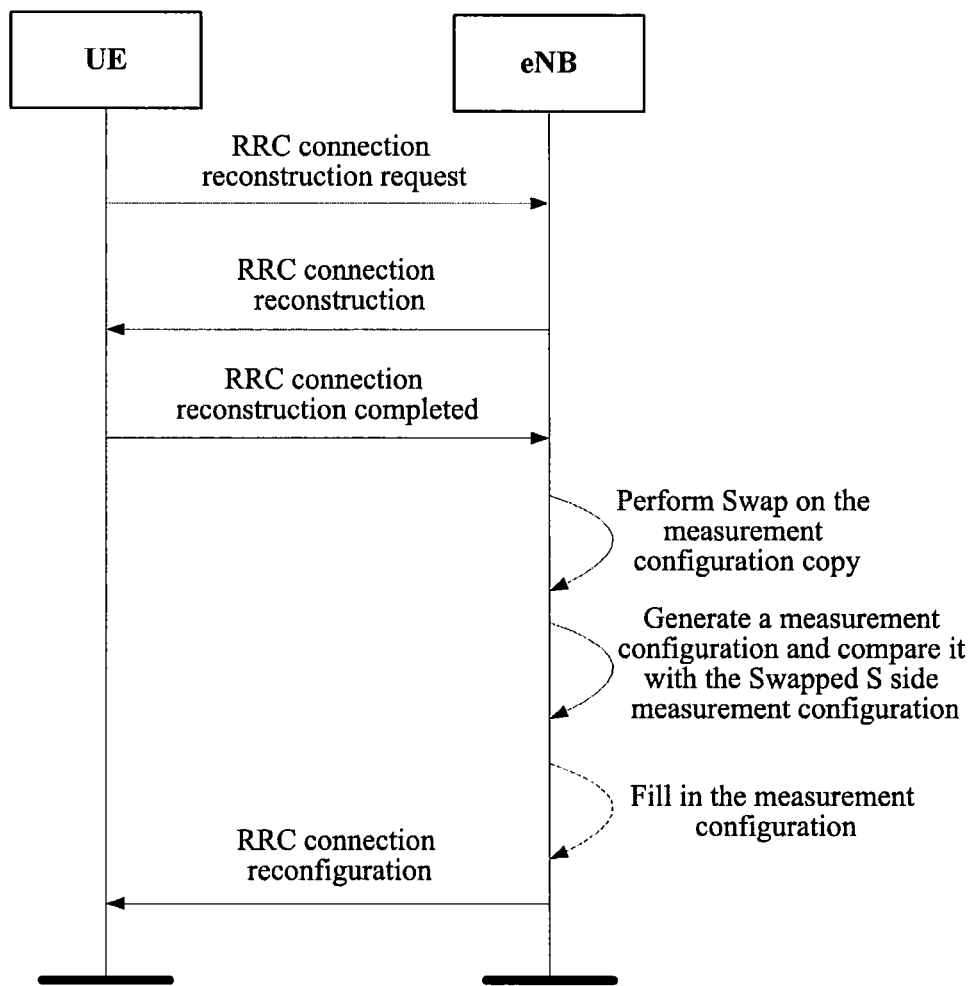
FIG. 4 is a flow chart of processing the inter-frequency RRC connection reconstruction measurement configuration provided in an embodiment of the present invention.

FIG. 4 shows a flow chart of processing the inter-frequency RRC connection reconstruction measurement configuration provided in an embodiment of the present invention, as shown in FIG. 4, if the inter-frequency switching from the cell__0 to the cell __1 fails, the eNB D in which the cell__1 is located stores the UE context information including the measurement configuration information, at this time, the process of the inter-frequency RRC connection reconstruction is as follows:

the UE sends a RRC connection reconstruction request to the eNB-D;

the eNB-D performs the Swap action on the measurement configuration copy to obtain a first measurement configuration;

the eNB-D generates a second measurement configuration according to its own configuration, such as the frequency point and ICIC function, the UE capability such as the supported band, the inter-frequency system, and so on, and stores the second measurement configuration;

compare the first measurement configuration with the second measurement configuration, when the first and second measurement configurations are the same, the measurement configuration is not filled in the RRC connection reconfiguration message, and in this case, the first measurement configuration is saved in eNB-D; if the first measurement configuration is a part of the second measurement configuration, the extra measurement configuration is filled in RRC connection reconfiguration message; when the first measurement configuration and the second measurement configuration are not the same, the first measurement configuration in the RRC connection reconfiguration message is placed into the deleting list, and the second measurement configuration is placed in the adding list.

According to the aforementioned method for processing the RRC connection reconstruction measurement configuration, assuming that there are two mutually inter-frequency neighboring cells: the cell__0 and the cell__1, the UE accesses the cell__0, and the cell__0 fails to switch to the cell__1, the cell__1 supports the ICIC function, then the process of the RRC connection reconstruction measurement configuration is as follows:

1. the UE sends a RRC connection reconstruction request to the cell __1 and receives a response from the cell__1, at this time, the cell__1 has stored the cell__0's measurement configuration copy;

2. the celli performs the Swap action on the saved cell__0's measurement configuration copy to obtain the first measurement configuration, and generates a second measurement configuration according to its own configuration and the UE capability, and compares the first measurement configuration with the second one;

3. the cell__1 supports the ICIC function, and except of the ICIC measurement configuration, the first measurement configuration and the second measurement configuration are the same, the ICIC measurement configuration is filled in the RRC connection reconfiguration message;

4. the cell__1 sends the RRC connection reconfiguration message.

This embodiment also provides a device for sending an inter-frequency measurement configuration, comprising:

a Swap action unit, which is configured to: perform a Swap action on the source side measurement configuration copy to generate a first measurement configuration; and send the first measurement configuration to a measurement configuration comparison unit connected with the Swap action unit;

a measurement configuration generation unit, which is configured to: generate a second measurement configuration according to its own configuration and the UE capability, and send the second measurement configuration to a measurement configuration comparison unit connected with the measurement configuration generation unit;

a measurement configuration comparison unit, which is configured to: receive and compare the second measurement configuration with the first measurement configuration; fill in the controlling message according to the comparison result and transmit the controlling message to a measurement configuration transmission unit connected with the measurement configuration comparison unit; wherein, when the first measurement configuration and the second measurement configuration are the same, the measurement configuration is not filled in the controlling message; when the first measurement configuration is a part of the second measurement configuration, in the controlling message, the extra measurement configuration at the destination side is placed in the adding list; when the first measurement configuration and the second measurement configuration are not the same, in the controlling message, the first measurement configuration is placed in a deleting list, and the second measurement configuration is placed in the adding list; and a measurement configuration transmission unit, which is configured to: send a Radio Resource Control (RRC) connection reconfiguration message to the UE according to the controlling message.

The inter-frequency measurement configuration is an inter-frequency switching measurement configuration or an inter-frequency RRC connection reconstruction measurement configuration.

When the process of sending inter-frequency measurement configurations is the process of sending the intra-eNB inter-frequency switching measurement configuration, the Swap action unit is also configured to: the eNB receives a measurement report reported by the UE, determine that it is an inter-frequency switching based on the measurement report, duplicate the measurement configuration into a measurement configuration copy and save the copy;

said controlling message is a RRC connection reconfiguration message.

When the measurement configuration transmission unit sends the RRC connection reconfiguration message to the UE, the method for sending the measurement configuration is the method for sending the intra-eNB switching.

When the process of sending the inter-frequency measurement configuration is the process of sending the intra-eNB inter-frequency switching measurement configuration, the Swap action unit is also configured to: after the source side eNB receives the measurement report reported by the UE, determine that it is an inter-frequency switching, and the way of determining the inter-frequency switching is X2 or S1;

the Swap action unit is configured to perform the Swap action on a measurement configuration copy formed on the basis of the measurement configuration to obtain the first measurement configuration as follows: when the device is at the source side eNB, form a measurement configuration copy from the current measurement configuration, and transmit the copy to the destination side eNB; when the device is at the destination side eNB, perform the Swap action on the source side measurement configuration copy to obtain the first measurement configuration;

the controlling message is a switching command;

the measurement configuration generation unit is configured to generate a second measurement configuration according to its own configuration and the UE capability as follows: when the device is at the destination side eNB, generate a second measurement configuration according to its own configuration and the UE capability, and store the second measurement configuration;

the measurement configuration transmission unit is configured to send the RRC connection reconfiguration message to the UE according to the controlling message as follows: when the measurement configuration transmission unit is at the destination side eNB, send the switching command to the source side eNB, when the measurement configuration transmission unit is at the source side eNB, generate and send a RRC connection reconfiguration message according to the switching command.

When the process of sending the inter-frequency measurement configuration is the process of sending the RRC connection reconstruction measurement configuration, the Swap action unit is configured to perform the Swap action on a measurement configuration copy formed on the basis of the measurement configuration to obtain the first measurement configuration as follows: after sending an inter-frequency measurement configuration to the eNB and receiving a response, perform the Swap action on the saved source side measurement configuration copy to obtain the first measurement configuration;

the controlling command is the RRC connection reconfiguration message.

The measurement configuration transmission unit is configured to send the RRC connection reconfiguration message with the method for sending the RRC connection reconstruction message.

Figure 5:
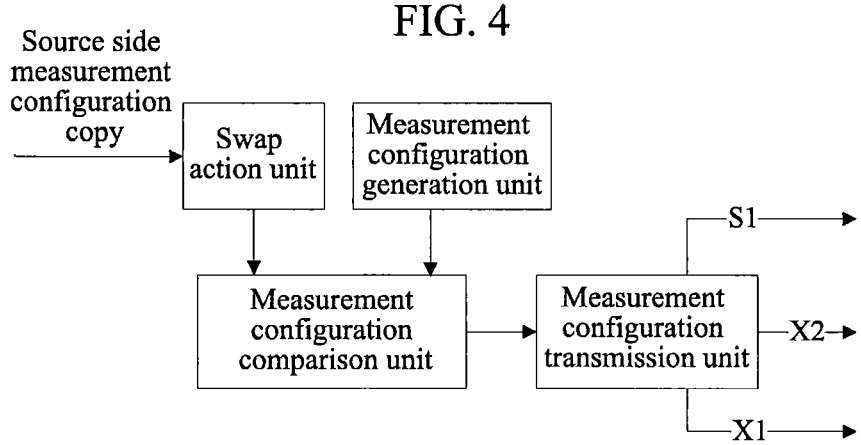
FIG. 5 is a block diagram of the device for correctly sending the inter-frequency switching and the inter-frequency RRC connection reconstruction measurement configuration provided in an embodiment of the present invention.

The aforementioned device is shown as FIG. 5 in an application example, and the FIG. 5 illustrates a block diagram of the device for correctly sending the inter-frequency switching and the inter-frequency RRC connection reconstruction measurement configuration provided in an embodiment of the present invention, as shown in FIG. 5, the device comprises:

the Swap action unit, which is configured to: perform a Swap action on the source side measurement configuration copy sent by the source side or stored by the swap action unit itself to generate a first measurement configuration; and send the first measurement configuration to a measurement configuration comparison unit connected with the swap action unit;

a measurement configuration generation unit, which is configured to: generate a second measurement configuration according to the eNB's own configuration such as the frequency point and the ICIC function, the UE capability such as the supported frequency band, the inter-frequency system, and so on, and send the second measurement configuration to the measurement configuration comparison unit connected with the measurement configuration generation unit;

the measurement configuration comparison unit, which is configured to: receive and compare the second measurement configuration with the first measurement configuration; fill the comparison result in the switching command or the RRC connection reconstruction message, and transmit the switching message to a measurement configuration transmission unit connected with the measurement configuration comparison unit. When the first measurement configuration and the second measurement configuration are the same, the measurement configuration is not filled in the switching command or the RRC connection reconfiguration message; when the first measurement configuration is a subset of the second measurement configuration, the extra measurement configuration at the destination side is placed in the switching command or the RRC connection reconfiguration message; when the first measurement configuration and the second measurement configurations are not the same, the first measurement configuration is placed in a deleting list and the second measurement configuration is placed in the adding list in the switching command or the RRC connection reconfiguration message; and a measurement configuration transmission unit, which is configured to: send the switching command to the source side through the X2 or S1 interface, or send the RRC connection reconfiguration message to the UE through the X1 interface.

When performing the intra-eNB inter-frequency switching, the measurement configuration comparison result is filled in the RRC connection reconfiguration message, in the way of sending the intra-eNB switching, the RRC connection reconfiguration message is sent to the UE through the X1 interface, when performing the inter-eNB inter-frequency switching, the measurement configuration comparison result is filled in the switching command, and is sent to the source side through the X2 interface in the X2 sending and switching way or sent to the source side through the S1 interface in the S1 sending and switching way; when performing the inter-frequency RRC connection reconstruction, the measurement configuration comparison result is filled in the RRC connection reconfiguration message, in the way of sending the inter-frequency RRC connection reconstruction, the RRC connection reconfiguration message is sent to the UE through the X1 interface.

As for the aforementioned inter-eNB inter-frequency switching, after the switching command is sent to the source side, the source side generates a RRC connection reconfiguration message according to the switching command, and sends the message to the UE through the X1 interface.

The aforementioned configuration measurements, the first measurement configuration and the second measurement configuration comprise the measurement ID (MeasID), the measurement object identification (MeasObjectID), the measurement object (MeasObject), the report configuration identification (ReportConfigID), and the report configuration (ReportConfig).

Notwithstanding the present invention is described in detail in the above description, the present invention is not limited to the description, those skilled in the field can provide various modifications based on the principle of the present invention. Therefore, all the modifications made in accordance with the inventive principles should be understood as falling into the protection scope of the present invention.

INDUSTRIAL APPLICABILITY

In summary, the method and device in the present invention can be used to make the destination side measurement configuration after the inter-frequency switching correct and to make the destination side measurement configuration consistent with the UE side measurement configuration, the method and device solve the problem of incorrect measurement configuration because the UE is lack of the measurement configuration or the measurement configuration is not available, in specific scenarios, they can also reduce the XI interface signaling and improve the system efficiency.

What is claimed is:

1. A method for sending an inter-frequency measurement configuration, the method comprising:
    an evolved Node B (eNB) performing a Swap action on a measurement configuration copy formed on a basis of the measurement configuration to obtain a first measurement configuration;
    the eNB generating a second measurement configuration according to configuration of the eNB and user equipment (UE) capability, and comparing the second measurement configuration with the first measurement configuration;
    when the first measurement configuration and the second measurement configuration are the same, measurement configuration being not filled in a controlling message; when the first measurement configuration is a part of the second measurement configuration, in the controlling message, an extra measurement configuration at a destination side being placed in an adding list; when the first measurement configuration and the second measurement configuration are not the same, in the controlling message, the first measurement configuration being placed in a deleting list, and the second measurement configuration being placed in the adding list; and
    the eNB sending a Radio Resource Control (RRC) connection reconfiguration message to the UE according to the controlling message.

2. The method of claim 1, wherein, the inter-frequency measurement configuration is an inter-frequency switching measurement configuration or an inter-frequency RRC connection reconstruction measurement configuration.

3. The method of claim 2, wherein, when the sending the inter-frequency measurement configuration is sending intra-eNB inter-frequency switching measurement configuration,
    before the step of the eNB performing the Swap action on a measurement configuration copy formed on the basis of the measurement configuration to obtain the first measurement configuration, said method further comprises: the eNB receiving a measurement report reported by the UE, and determining an inter-frequency switching based on the measurement report, and duplicating the measurement configuration into a measurement configuration copy and saving the measurement configuration copy;
    said controlling message is a RRC connection reconfiguration message.

4. The method of claim 3, wherein, in the step of the eNB sending the RRC connection reconfiguration message to the UE, the sending the measurement configuration is sending the intra-eNB switching.

5. The method of claim 2, wherein, when the sending the inter-frequency measurement configuration is sending the inter-eNB inter-frequency switching measurement configuration,
    before the step of the eNB performing the Swap action on the measurement configuration copy formed on the basis of the measurement configuration to obtain the first measurement configuration, said method comprises: after receiving the measurement report reported by the UE, the source side eNB determining an inter-frequency switching, and determining the inter-frequency switching as X2 or S1;
    the step of the eNB performing the Swap action on a measurement configuration copy formed on the basis of the measurement configuration to obtain the first measurement configuration comprises: the source side eNB forming a measurement configuration copy from the current measurement configuration, and transmitting the measurement configuration copy to the destination side eNB; the destination side eNB performing the Swap action on the source side measurement configuration copy to obtain the first measurement configuration;
    the controlling message is a switching command;
    the step of the eNB generating the second measurement configuration according to configuration of the eNB and the UE capability comprises: the eNB at a destination side generating the second measurement configuration according to the configuration of the eNB and the user equipment (UE) capability and storing the second measurement configuration;
    the step of eNB sending the RRC connection reconfiguration message to the UE according to the controlling message comprises: the eNB at the destination side sending the switching command to the eNB at a source side, and the eNB of the source side generating and sending a RRC connection reconfiguration message according to the switching command.

6. The method of claim 5, wherein, in the step of the eNB at the source side generating and sending the RRC connection reconfiguration message in accordance with the switching command, a way of sending measurement configuration is the way of X2 switching and sending and the way of S1 switching and sending.

7. The method of claim 2, wherein, when the sending the inter-frequency measurement configuration is sending the RRC connection reconstruction measurement configuration,
    the step of the eNB performing the Swap action on a measurement configuration copy formed on the basis of the measurement configuration to obtain the first measurement configuration comprises: after the UE sends an inter-frequency measurement configuration to the eNB and receives a response, the eNB performing the Swap action on the saved measurement configuration copy at the source side to obtain the first measurement configuration;
    the controlling command is the RRC connection reconfiguration message.

8. The method of claim 7, wherein, in the step of the eNB sending the RRC connection reconfiguration message, a way of sending the measurement configuration is the way of sending the inter-frequency RRC connection reconstruction.

9. A device for sending an inter-frequency measurement configuration, comprising:
    a Swap action unit, configured to: perform a Swap action on a measurement configuration copy at a source side to obtain a first measurement configuration; and send the first measurement configuration to a measurement configuration comparison unit connected with the Swap action unit;
    a measurement configuration generation unit, configured to: generate a second measurement configuration according to eNB's own related configuration and user equipment (UE) capability, and send the second measurement configuration to a measurement configuration comparison unit connected with the measurement configuration generation unit;

a measurement configuration comparison unit, configured to: receive the second measurement configuration and the first measurement configuration and compare the second measurement configuration with the first measurement configuration; fill in a controlling message according to the comparison result and transmit the controlling message to a measurement configuration transmission unit connected with the measurement configuration comparison unit; wherein, when the first measurement configuration and the second measurement configuration are the same, measurement configuration is not filled in the controlling message; when the first measurement configuration is a part of the second measurement configuration, in the controlling message, an extra measurement configuration at a destination side is placed in an adding list; when the first measurement configuration and the second measurement configuration are not the same, in the controlling message, the first measurement configuration is placed in a deleting list, and the second measurement configuration is placed in the adding list; and a measurement configuration transmission unit, configured to: send a Radio Resource Control (RRC) connection reconfiguration message to the UE according to the controlling message.

10. The device of claim 9, wherein, the inter-frequency measurement configuration is an inter-frequency switching measurement configuration or an inter-frequency RRC connection reconstruction measurement configuration.

11. The device of claim 10, wherein, when the sending the inter-frequency measurement configuration is sending intra-eNB inter-frequency switching measurement configuration, the Swap action unit is also configured to: after the eNB receives a measurement report reported by the UE, determine an inter-frequency switching based on the measurement report, and duplicate the measurement configuration into a measurement configuration copy and save the copy;

said controlling message is a RRC connection reconfiguration message.

12. The device of claim 11, wherein, when the measurement configuration transmission unit sends the RRC connection reconfiguration message to the UE, a way of sending the measurement configuration is the way of sending intra-eNB switching.

13. The device of claim 10, wherein, when the sending the inter-frequency measurement configuration is sending inter-eNB inter-frequency switching measurement configuration, the swap action unit is also configured to: after the eNB at a source side receives the measurement report reported by the UE, determine an inter-frequency switching, and determining a way of inter-frequency switching is X2 or S1;

the Swap action unit is configured to perform the Swap action on a measurement configuration copy formed on a basis of the measurement configuration to obtain the first measurement configuration as follows: when the device is at the source side eNB, form a measurement configuration copy from the current measurement configuration, and transmit the copy to the destination side eNB; when the device is at the destination side eNB, perform the Swap action on the source side measurement configuration copy to obtain the first measurement configuration;

the controlling message is a switching command;

the measurement configuration generation unit is configured to generate a second measurement configuration according to the measurement configuration generation unit's own configuration and the UE capability as follows: when the device is at the destination side eNB, generate and save the second measurement configuration according to the measurement configuration generation unit's own configuration and the user equipment (UE) capability;

the measurement configuration transmission unit is configured to send the RRC connection reconfiguration message to the UE according to the controlling message as follows: when the measurement configuration transmission unit is at the destination side eNB, send the switching command to the source side eNB, and when the measurement configuration transmission unit is at the source side eNB, generate a RRC connection reconfiguration message according to the switching command and send the RRC connection reconfiguration message.

14. The device of claim 10, wherein, when the sending the inter-frequency measurement configuration is sending the RRC connection reconstruction measurement configuration, the Swap action unit is configured to perform the Swap action on a measurement configuration copy formed on a basis of the measurement configuration to obtain the first measurement configuration as follows: after sending an inter-frequency measurement configuration to the eNB and receiving a response, perform the Swap action on the saved measurement configuration copy at the source side to obtain the first measurement configuration;

the controlling command is the RRC connection reconfiguration message.

15. The device of claim 14, wherein, the measurement configuration transmission unit is configured to send the RRC connection reconfiguration message by the way of sending the RRC connection reconstruction message.

* * * * *